United States Patent

[11] 3,621,238

[72] Inventors Roland A. Jalbert;
Richard D. Hiebert, both of Los Alamos, N. Mex.
[21] Appl. No. 71,042
[22] Filed Sept. 10, 1970
[45] Patented Nov. 16, 1971
[73] Assignee The United States of America as represented by the United States Atomic Energy Commission

[54] GAMMA INSENSITIVE AIR MONITOR FOR RADIOACTIVE GASES
2 Claims, 2 Drawing Figs.
[52] U.S. Cl.................................................. 250/83.6 FT,
250/44, 250/83 C, 250/83.3 R, 250/83.6 R, 250/106 SC
[51] Int. Cl....................................................... G01t 1/18

[50] Field of Search............................................ 250/83.6 R,
83.6 FT, 83 SA, 106 SC, 71.5 R, 83.3 R, 83 C, 44

[56] References Cited
UNITED STATES PATENTS
2,641,710 6/1953 Pompeo et al................ 250/83.6 FT
Primary Examiner—James W. Lawrence
Assistant Examiner—Morton J. Frome
Attorney—Roland A. Anderson ABSTRACT: An ionization chamber instrument for measuring the concentration of radioactive gases in air is described. External gamma radiation effects on the instrument are eliminated through use of a compensating chamber mounted next to the measuring chamber with both chambers orbiting about a common axis.

INVENTOR.
Roland A. Jalbert
Richard D. Hiebert

INVENTOR.
Roland A. Jalbert
Richard D. Hiebert

GAMMA INSENSITIVE AIR MONITOR FOR RADIOACTIVE GASES

The invention described herein was made in the course of, or under, a contract with the U. S. Atomic Energy Commission.

The most common prior art method for measuring the concentration of radioactive gases in the atmosphere is by means of an ionization chamber instrument. Air to be sampled is ordinarily introduced into the chamber and pumped through for continuous monitoring. The method is straightforward and usually of adequate sensitivity. A major problem associated with this technique is that the chamber is also sensitive to external, penetrating radiation such as X- or gamma rays. This is a frequent problem around reactors and accelerators and is handled by one of two basic approaches. One brute force solution is to decrease the external radiation field to negligible levels by shielding the chamber, or by removing the chamber to a low background area and then sampling with a long hose. The other approach is to subtract from the total instrument output that contribution which is from the external radiation. If the external radiation is constant, this subtraction can be done quite easily. If the external radiation is not constant, which is the usual case, then internal compensation can be achieved with a separate closed chamber, identical in volume and material to the open measuring chamber, but electrically connected so that its ionization currents subtract from those currents produced in the measuring chamber. Therefore, in the ideal concept, the difference in currents between the open chamber and the closed chamber will be a measure of the amount of radioactivity introduced by the airflow in the open chamber. However, in the practical sense, achievement of good compensation for any and all energies of external radiation and for a wide range of radiation intensities of unpredictable geometric field patterns is indeed difficult. Previous efforts at gamma compensation have used fixed side-by-side chambers which suffer from severe directional sensitivity, or concentric chambers which have lower order geometrical problems but greater sensitivity to energy absorption differences.

Another prior art technique for measuring the concentration of tritium gas in the atmosphere employs plastic scintillation material in sheet or rod assemblies through which air to be sampled flows. Light pulses from the scintillator are viewed by two photomultiplier tubes arranged for coincidence counting only those pulses above a given noise amplitude, but below an amplitude determined by the tritium energy spectrum, thereby reducing the gamma response. Since the thin plastic materials have a high surface-to-volume ratio, the detector sensitivity to external radiation is further reduced. The ability to reject gamma pulses preferentially, in the case of tritium limits the usefulness of this type instrument in detecting or measuring gases with more penetrating radiation in the presence of an external field. Another disadvantage is the inherent high sensitivity to a high neutron field. Neither of these factors is significant when employing the ionization chamber technique.

SUMMARY OF THE INVENTION

The device and method of the invention described herein employs ionization chambers but is dynamic with both chambers orbiting about a common axis parallel to, and equidistant from, the centerlines of the two chambers. Therefore, on the average each chamber occupies the same region in space for the same amount of time, and the previously mentioned physical limitations of compensation are minimal. The desired signal current (being the difference in the two chamber currents) is filtered to remove any alternating component resulting from nonuniformities in the radiation field as the chambers sweep through it, and amplified with a DC electrometer. It is important that this amplification be carefully done on the rotating assembly to avoid noise and other spurious effects in conducting signals from the orbiting assembly to the fixed structure.

The above and other objects and features of the invention will be made apparent to those skilled in the art from a consideration of the following detailed description of a preferred embodiment taken in conjunction with the accompanying drawings wherein.

Figure 1:
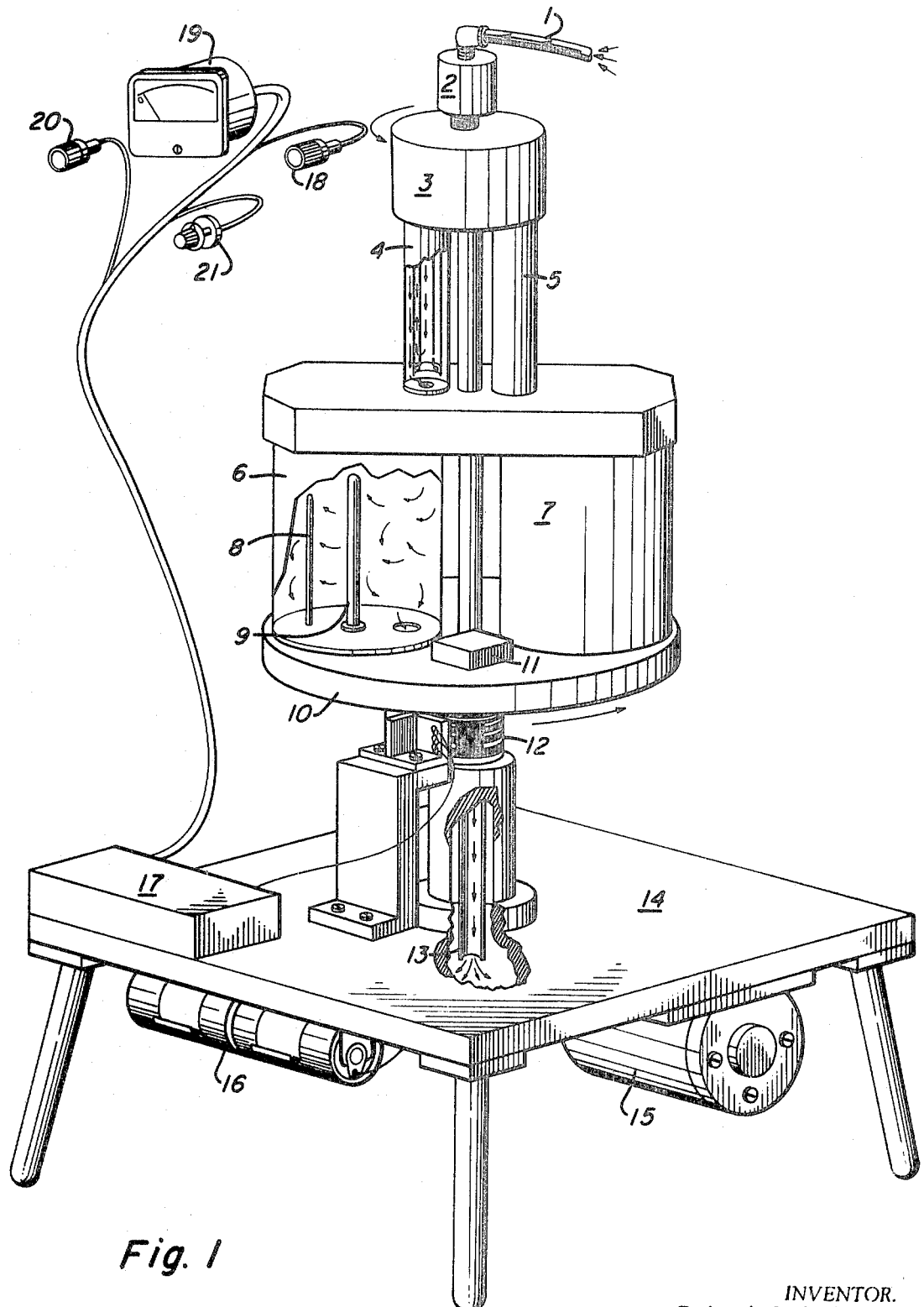
FIG. 1 is a perspective view of the device of this invention with its associated hardware and shown partially in cross section and partially cut away so as to show the interior of one chamber.

The basic features of the instrument are shown in FIG. 1. Air is drawn through a particulate filter by an air pump (not shown) which is mounted beneath the fixed platform 14. Air leaving the pump passes to the flow-through chamber 6 by way of tubing 1, modified Hansen quick-disconnect 2, and ion precipitator 4. The function of the precipitator is to remove ions formed in the line and outside air, thus assuring that only those ions produced within the ionization chamber will be measured. Shown also is a cover 3 to provide mechanical rigidity and an air path to the precipitator, and a "dummy" precipitator 5 to insure external symmetry for direct or scattered radiations to the two chambers. Between the flow-through 6 and closed 7 chambers is the electrometer amplifier 11. Its dummy counterpart is on the opposite side of the rotating platform 10. Each chamber has a central collecting electrode 9 and a "volume" compensating electrode 8. Air leaving the flow-through chamber passes through a channel in the platform 10 to the central hollow shaft 13 and finally exits at the end of the shaft. The drive motor 15 provides power to rotate the assembly at 1.7 r.p.s.

Figure 2:
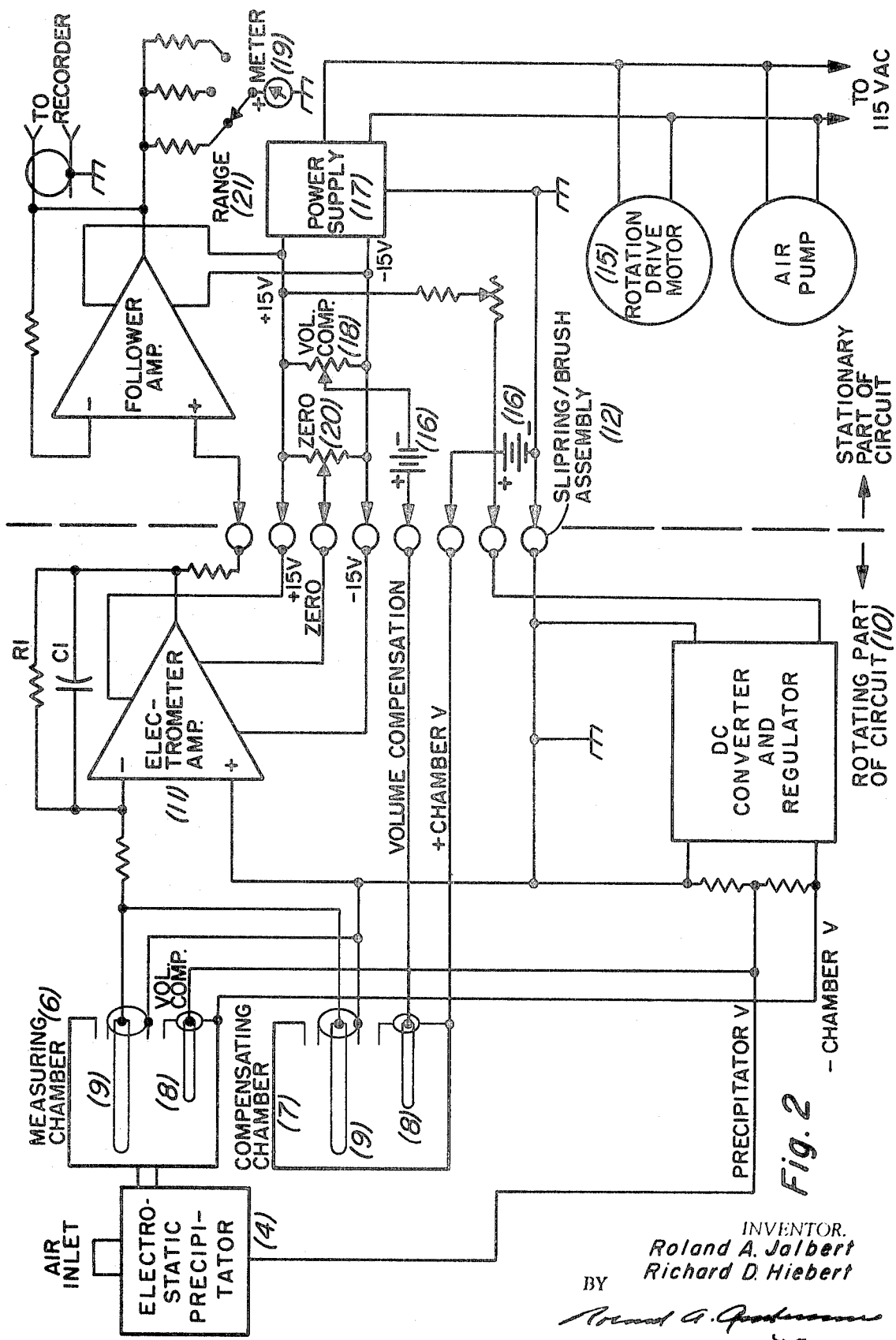
FIG. 2 shows the circuitry associated with the device of FIG. 1.

The amplifying circuitry and electrical connections for the instrument are shown in FIG. 2. The part of the circuit mounted on the rotating assembly is shown on the left of the figure, and the stationary section is on the right. The center electrodes 9 of the two ionization chambers are connected together and feed a high gain MOSFET electrometer amplifier with ground potential as a reference. Feedback action of the amplifier through R1 results in a transresistance ($E_{out}/I_{in}$) of one teraohm. The addition of C1 across R1 gives an integrating time constant of 10 sec. which is adequate smoothing for most conditions that give rise to alternating signal components. Output of the amplifier leaves the rotating assembly via slipring 12 as do the power and zero adjustment 20 connections of the amplifier. Subtraction of the currents in the two chambers is achieved by having opposite polarity of voltages on the walls of the chambers. A high (550v.) negative potential on the measuring chamber 6 results in highly efficient collection of electrons at the center electrode, even with a high gas flow rate through the chamber. The compensating (closed) chamber 7 has a lower potential of +60 v. on the wall, resulting in the efficient collection of ions at the center electrode. The center electrodes of both chambers have grounded electrical guard rings to prevent platform leakage currents from entering the measuring circuit.

The volumes of the two chambers will not be exactly equal even if the greatest of care is taken in fabrication. Further, there will be a slight pressure difference between the open and closed chambers. Therefore, an extra small electrode 8 is placed in each chamber for electrical volume compensation. The electrode in the measuring chamber is maintained at fixed potential, whereas the electrode in the compensating chamber is given a variable 18 potential so that the effective volume, of that chamber can be brought to precise radiation sensitivity balance with the measuring chamber. A DC converter (not shown in FIG. 1) to supply the high voltages to the measuring chamber is included on the rotating platform. This arrangement avoids the problem of transmitting high voltages on the sliprings. The same power supply furnishes the high potential to the electrostatic precipitator 4. The electrometer amplifier output feeds an integrated circuit follower amplifier sn the fixed structure. This second amplifier is needed only to furnish drive power for whatever metering, recording, or alarm device one desires. FIG. 2 shows connections to an external recorder, and to a local front panel meter 19 with switch-selected 21 full-scale ranges corresponding to input currents of 0.1 pa., 1 pa., and 10 pa., External time constants, to be mentioned below, can be placed at the input to the recorder. The power supply 17 at the base of the instrument furnishes the standard operational amplifier voltages to the active circuits. The coin silver sliprings on the rotor and silver graphite brushes on the fixed structure provide the necessary low-noise sliding electrical connections to the platform.

Since the instrument of this invention was designed primarily to measure concentrations of tritium gas, its sensitivity is given for that isotope only. For other gases corresponding performance figures can be calculated quite readily. The three ranges of current sensitivity given above correspond to full-scale tritium concentrations of approximately 140 $\mu Ci/m.^3$, 1.4 $mCi/m.^3$, and 14 $mCi/m.^3$ respectively. These sensitivities have been experimentally verified in a tritium gas calibration chamber, in the presence of external gamma fields of 0 to approximately 50 mR/h (the highest available at the calibration facility). Theoretically, total subtraction of currents from the two chambers is possible if complete geometrical symmetry is achieved on the rotating assembly and if proper compensation is made to adjust the two currents so that they are equal in a particular field strength. Once equal, they would remain so in any external field. The actual behavior of the instrument in an external X- or gamma field is dependent on a number of operational and theoretical factors. small pressure differences between the two chambers must be considered. Temperature differences between the gases in the chambers must be minimized. Complete charge collection must be accomplished for a wide range of operating conditions. Finally, the ultimate theoretical problem of measuring small differences in two large, statistically varying quantities remains. The volume compensation control is used to trim out the slight pressure buildup in the flow-through chamber resulting from the pressure head in the exit tube. Ambient barometric pressure changes are not serious, since the closed chamber is not vacuumtight and is able to keep up with those slow changes. Ambient temperature changes which can affect the chamber responds in the same way as pressure are also usually not rapid enough to cause difficulty. The heat introduced to the sampled air from friction in the air pump is removed by making the inlet tubing (part 1 of FIG. 1) of several feet of coiled copper. The typical sampled airflow rate of 20 l./min. is low enough that adequate charge collection is achieved (with the chamber potentials given above) in external radiation fields up to several hundred mR/h. This collection is enhanced by a small deflector at the inlet to the measuring chamber to give turbulent flow for the passing air.

Although complete current subtraction seems possible in principle for any external radiation field, in practice when to currents with equal average value, but which are instantaneously varying due to statistical generating processes, are subtracted, the difference will drift about zero. The magnitude of this background drift will establish the minimum detectable or measurable concentration of radioactive gas that can be measured in a given set of conditions. The magnitude of the drift is directly proportional to the square root of the external radiation field intensity. Since it is also inversely proportional to the square root of the electronic time constant, it is advantageous to use as long a time constant as is reasonable consistent with the monitoring requirements. In measuring slowly changing concentrations of a radioactive gas a long time constant may be used (e.g., several minutes or longer). For situations involving possible sudden releases of gas a shorter time constant should be use. The performance figures given below are based on a time constant of 50 sec., comparable to that used in many other gas monitors The standard deviation $\sigma$ of the output from a given external field is defined as one-half of the range of instantaneous values that exist 68 percent of the time, whereas 95 percent of the instantaneous values fall within the $\pm 2\sigma$ range. The values below were experimentally determined and agree reasonably well with those theoretically predicted.

| $^{60}Co$ Gamma Field (mR./h.) | $\sigma$ ($\times 10^{13}$ A) |
| --- | --- |
| 9 | 0.008 |
| 37 | 0.015 |
| 47 | 0.018 |
| 95 | 0.030 |
| 140 | 0.050 |

The maximum external field that can be tolerated will depend both on the required monitoring sensitivity and the time one is willing to wait before determining whether radioactive gas is indeed present. As an example, using a time constant of 50 sec., one would have 95 percent confidence (equivalent to $\pm 2\sigma$) of the presence of a radio active gas within 50 sec., if the indicated concentration exceeded that corresponding to $4\sigma/0.63 \cong 6.3\sigma$. (The factor center-tapped 0.63 comes from the assumed one-time constant from the instant of presence of gas until the time of observation.) Specifically, in a radiation field of 37 mR/h 6.3$\sigma$ corresponds to (140 $\mu Ci/m.^3$) (6.3) 0.015)= 13 $\mu Ci/m.^3$ of tritium gas. However, by waiting several minutes and using the recorded output to provide the necessary averaging, MPC (5 $\mu Ci/m.^3$ = 1 MPC) amounts of tritium gas can be detected and measured in unknown gamma fields up to 50—100 mR/h.

As has been pointed out, the limitations on the performance of this instrument are theoretical in nature. On the other hand, instruments using stationary chambers are mainly limited by their inability to make adequate subtraction in radiation fields that are nonuniform or that change in energy or geometry. Thus, comparison of the performance characteristics of the orbiting vs. stationary chambers is difficult, Manufacturers of side-by-side chamber instruments with comparable tritium sensitivity commonly specify that their gamma compensation ability is limited to several mR/h of a uniform external field. Typical performance of concentric chamber instruments shows compensation which varies directionally from 95 percent to 105 percent. Translated to tritium measurements this means that in a field of 10 mR/h corresponding to about $10^3$ $\mu Ci/m.^3$ (with no compensation), the instrument reading would vary from minus 50 $\mu Ci/m.^3$ to plus 50 $\mu Ci/m.^3$, for a range of 100 $\mu Ci/m.^3$. This can be considered the minimum detectable amount (with 100 percent confidence) in an unknown, but not exceeding 10 mR/h, gamma field. Side-by-side chambers would be even worse for directional sensitivity. No data are available on energy response of either type of ionization chamber instrument, but any design that involves unequal passage of radiation through material to reach the two chambers is destined to have severe compensation problems at the lower energies. The response of scintillation instruments is reported to be 3 $\mu Ci/m.^3$ of tritium gas per mR/h external gamma field. This means that in an external field of 10 mR/h, the instrument responds with a signal equivalent to about 30 $\mu Ci/m.^3$ of tritium, which is then the minimum detectable amount in an unknown field up to 10 mR/h. By comparison, 7 $\mu Ci/m.^3$ can be detected (with 95 percent confidence in one time constant) in the presence of a 10 mR/h field using the orbiting chamber instrument. Smaller concentrations can be detected and measured of course, by waiting longer.

In the two prior art methods mentioned above (fixed chambers, scintillation instruments) a signal from an unknown radiation field cannot be differentiated from a signal from a concentration of radioactive gas. In the case of the rotating chambers, however, a signal from an external radiation field shows up as noise, the magnitude of which is proportional to the square root of the field intensity. A signal from radioactive air is a positive DC component added to the noise and can be differentiated from it. Thus, the output can tell the observer both the magnitude of the external field and the concentration of the radioactive gas present. It is assumed, as implied earlier, that in order to do this, it is necessary to wait a few time constants (to provide the necessary averaging). Thus, this technique of employing rotating chambers is superior to the other methods being employed in that it permits separation of the responses from the external radiation field and the radioactive air being sampled.

What we claim is:

1. A device for measuring the concentration of radioactive gases in a gaseous mixture comprising a first ionization chamber, means to pass the gaseous mixture through said first chamber, a second ionization chamber identical in size and material to said first chamber, a rotatable platform in which the chambers are mounted, a motor that rotates said platform so that on the average each chamber occupies the same region in space for the same amount of time, electrodes within each chamber, a power source and output means; said chambers, power source, electrodes and output means being electrically connected.

2. A method for measuring the concentration of radioactive gases in a gaseous mixture using a device comprising a first ionization chamber, means to pass the gaseous mixture through the first chamber, a second ionization chamber identical in size and material to said first chamber, a rotatable platform on which the chambers are mounted, a motor that rotates said platform so that on the average each chamber occupies the same region in space for the same amount of time, electrodes within the each chamber, a power source, and output means; said chambers, power source, electrodes and output means being electrically connected, said method comprising a. introducing the gaseous mixture into a first chamber,
b. having a second chamber identical in size to the said first chamber,
c. rotating the platform on which the two chambers are mounted at a high rate of speed so that each chamber occupies the same region in space for the same amount of time, and
d. having electrodes within each chamber which are electrically connected so that the current in one chamber is subtracted from the current in the other chamber before it reaches a conventional readout circuitry.

* * * * *